Patented Mar. 7, 1933

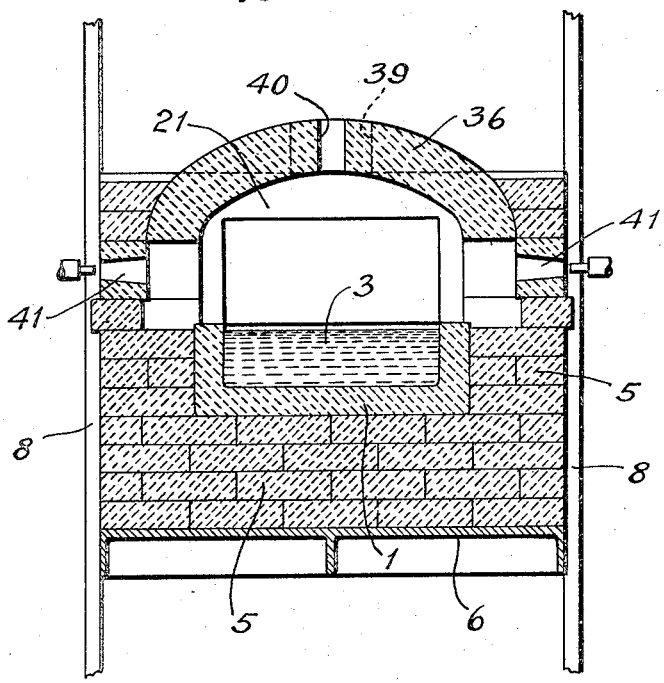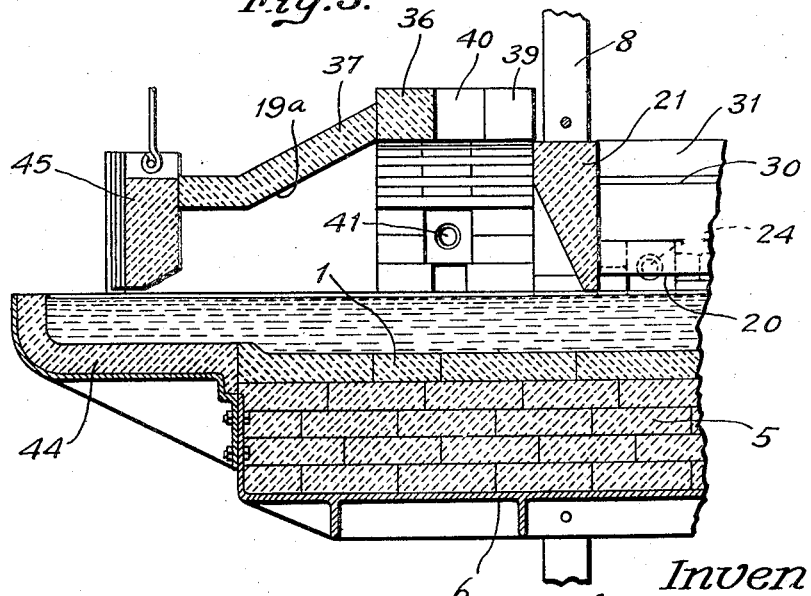

1,900,361

UNITED STATES PATENT OFFICE

VERGIL MULHOLLAND, OF WEST HARTFORD, AND ALFRED R. HUNTER, OF HARTFORD, CONNECTICUT, ASSIGNORS TO HARTFORD-EMPIRE COMPANY, OF HARTFORD, CONNECTICUT, A CORPORATION OF DELAWARE

FOREHEARTH FOR MOLTEN GLASS

Application filed October 23, 1929. Serial No. 401,831.

This invention relates to forehearths for receiving molten glass from a melting furnace and for conducting such glass in a stream to a feed spout, gathering basin or other place at which glass is to be fed in mold charges, gathered in suction gathering receptacles or otherwise removed.

The invention has particular reference to a forehearth wherein the temperature, viscosity and condition of the glass received from the melting furnace may be regulably controlled during the passage of such glass to the place at which glass is to be removed.

It is well known that molten glass flowing in a stream from a melting furnace or like source of supply along a flow passage will tend to flow more slowly and to become relatively cool at the sides of such stream while the middle portion of the stream will be relatively hot and will flow more rapidly. This condition is known as "channeling" and may interfere materially with the removal at the delivery end of the flow passage of glass sufficiently uniform in temperature, viscosity and condition to permit the use of such glass in the manner and for the purpose desired, as for fabrication into satisfactory articles of glassware. The glass in the side or border portions of the stream may become more or less stagnant and portions thereof may devitrify or become "cordy" when "channeling" exists. Portions of the devitrified or relatively cool glass may "slough off" and be entrained with the relatively hot and more fluid glass at the median portion of the stream and thus may interfere with proper feeding or removal of satisfactory glass at the delivery end of the flow passage.

An object of the present invention is to provide an improved forehearth in which "channeling" will be practically eliminated and in which the glass from the melting furnace may be conditioned throughout practically its entire cross section so that the glass passing to the delivery end of the forehearth may be homogeneous and uniform in temperature and viscosity and may be regulably conditioned according to the particular requirements at any given time for the glass that is to be used.

A further object of the invention is the provision of an improved forehearth wherein the glass of the side portions of the stream from the melting furnace may be locally heated to the extent required to overcome the tendency of such portions of the glass stream to become unduly cool and until such portions of the stream have the desired temperature and viscosity while the middle portion of the stream, which tends to remain relatively hot, may be cooled to the extent required to assure uniformity of temperature and viscosity of the glass throughout the cross section of the stream.

A further object of the invention is to provide for variable heating of the side portions of the stream and for the differential cooling of the middle portion of the stream of glass at different places along the length of the forehearth.

A still further object of the invention is to provide a forehearth which not only has provision for regulable heating of the relatively cool side portions of the stream and regulable cooling of the relatively hot middle portion of the stream throughout a substantial part of the length of the forehearth but also has provision for the establishment and maintenance of the proper temperature and draft conditions in the space at and adjacent to the delivery end of the forehearth to bring and maintain the glass at such place to and in the proper condition of temperature and viscosity to permit the feeding or removal of satisfactory glass.

Other objects and advantages of the invention will become apparent from the following description, when it is considered in conjunction with the accompanying drawings, in which:

Fig. 4 is a transverse section substantially along the line 4—4 of Fig. 1; and

Fig. 5 is a fragmentary view of a modified form of forehearth construction, the view being generally similar to the outer end portion of Fig. 1 but showing a basin for a glass gathering pool at the outer end of the forehearth channel instead of the glass feeding spout structure of Fig. 1.

Figure 1:
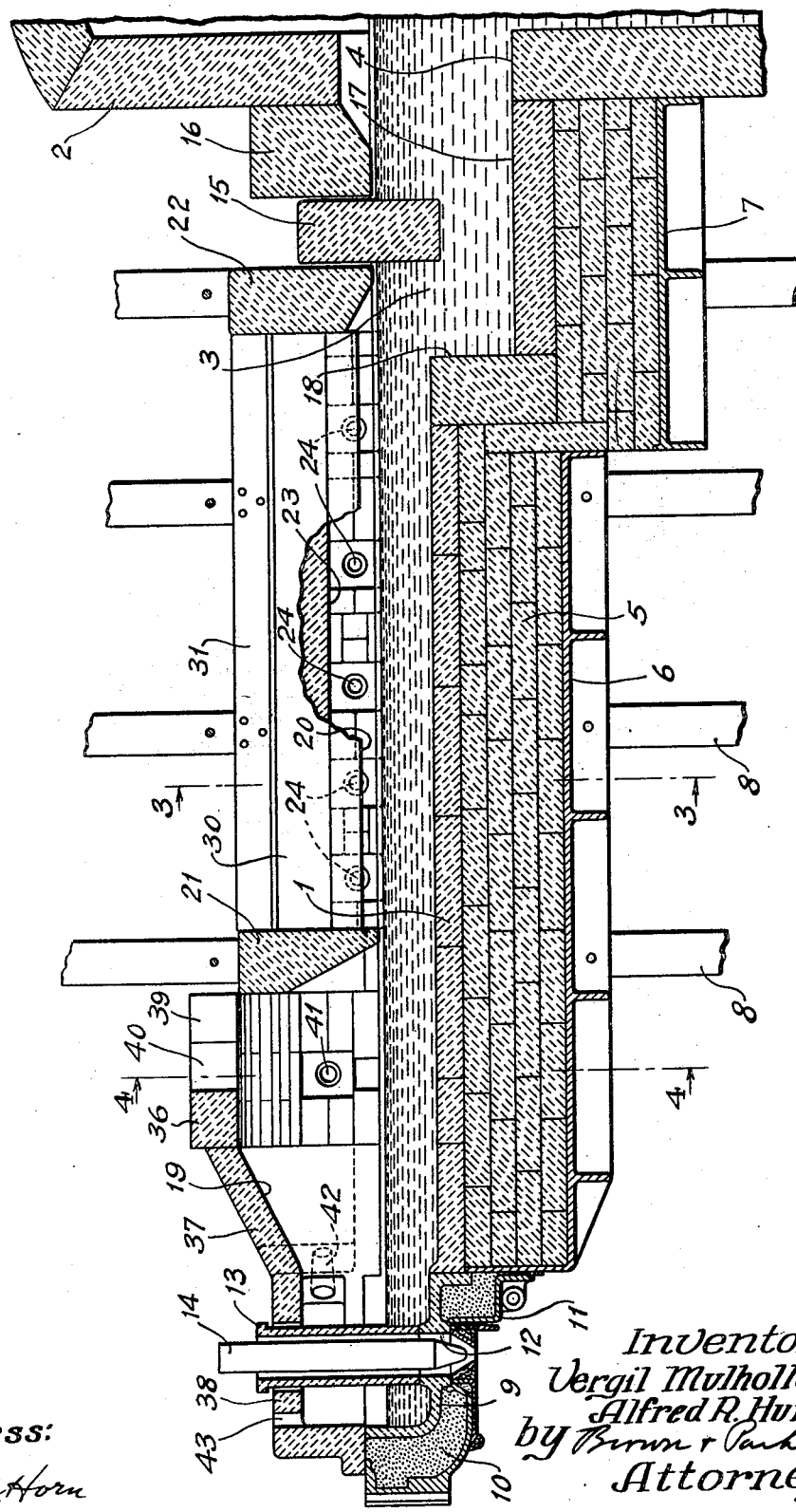
Figure 1 is a view, mainly in longitudinal vertical section and partly in side elevation with portions broken away, showing a forehearth embodying the invention applied to a glass melting furnace, only a fragmentary portion of the latter being shown.

The invention, generally described, provides a channel along which molten glass may flow from an associate melting furnace to a place at the outer end of the channel at which the glass is to be fed or otherwise removed. The bottom and sides of the channel and the bowl or basin for holding the glass at the delivery end of the forehearth preferably are insulated to minimize and prevent so far as possible radiation of heat through the glass contacting walls of the forehearth. The regulable local heating of the side or border portions of the glass stream in the forehearth contemplated by the invention may be effected by providing side firing spaces into which flame from burners may be projected, the walls of such firing spaces being so designed that the heat from the burners is applied to the glass mainly at the side edge or border portions of the glass stream without materially heating the glass at the longitudinal median portion of the stream. Preferably, provision is made for independently regulating the amount and character of heat applied to the side portions of the glass stream at different places along the length of such stream.

In addition to making provision for the local regulable heating of the side portions of the glass stream, the invention provides for the regulable and variable cooling of the middle portion of the stream along a substantial part of the length of the forehearth. This may be accomplished by providing a longitudinally extending opening of varying width in the forehearth top above the longitudinal median portion of the stream so that radiation of heat from the longitudinal median portion of the stream may be practically unobstructed. The inner walls of the forehearth top between the side firing chambers and the central cooling opening preferably are formed so that the cooling of the longitudinal median portion of the stream will not detrimentally affect the local heating of the glass at the side portions of the stream nor will the heating of the side portions of the stream prevent the desired radiation of heat from the middle portion of the stream through the cooling opening.

The side heating chambers and the longitudinal median cooling opening preferably are practically separated from the space above the glass at the delivery end of the forehearth and the invention contemplates the provision of suitable means for controlling the temperature and draft conditions in the space above the glass at the delivery end of the forehearth so that the glass therein may be brought to and retained at the temperature and viscosity best suited for the feeding or removal of glass in the manner and for the purpose intended.

In order to permit proper conditioning of the glass in the forehearth and the maintenance of desirable conditions in the space above the glass in the forehearth, such space preferably is closed off from the space above the glass in the furnace.

The heat referred to as being provided for heating the glass in the forehearth may be supplied by any suitable known means, as by burners or electric heating elements. Specific references herein to burners and to flame or mixtures in combustion projected therefrom are to be understood to include other known heating means and the heat supplied thereby.

Figure 2:
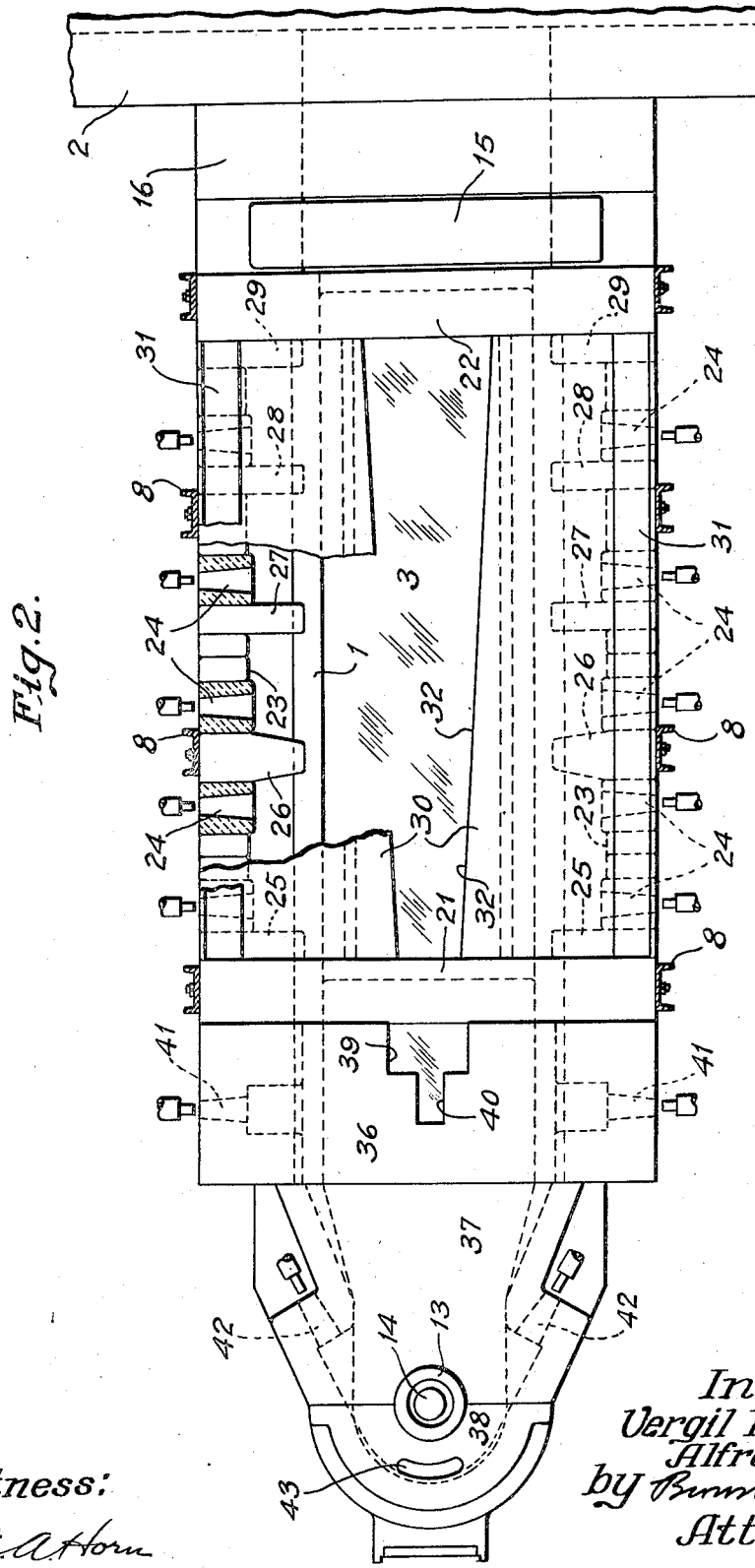
Fig. 2 is a plan view of the construction shown in Fig. 1 with a portion of the cover broken away to disclose underlying parts.

Referring now to the drawings, and more particularly to the construction shown in Figs. 1 to 4 inclusive, it will be noted that a forehearth embodying structural features of the invention may comprise a flow channel, generally indicated at 1, appurtenant to a glass melting furnace, indicated at 2 in Figs. 1 and 2. The flow channel 1 has bottom and side walls made of suitable refractory material and suitably supported and insulated so that glass 3 from the lateral outlet 4 of the melting furnace 2 will flow along the channel with a minimum of loss of heat by radiation through the walls of the channel. In the particular construction shown in Figs. 1 to 4 inclusive, the channel 1 is insulated at its bottom and sides by insulating brick 5 which are supported and retained in place by a frame structure comprising the bottom supporting plates 6 and 7 and the uprights 8, such frame structure preferably being connected with the frame structure of the melting furnace so that the inner end of the channel 1 will be maintained in the proper position to receive glass from the furnace outlet 4 to the best advantage and so that relative expansion and contraction of the walls of the forehearth and of the melting furnace may take place as the temperatures of such parts vary without impairing the connection between the forehearth and the furnace and without causing harmful stresses on the refractory parts at the junction between the forehearth and the furnace. However, it is to be understood that the refractory flow channel of the present invention may be insulated and supported in any other suitable known manner, as for example, by the supporting and insulating means of the construction of the well-known Hartford single feeder, a disclosure of which may be found in British Patent No. 227,078, granted Aug. 27, 1925 to the Hartford Empire Co.

A glass feed spout 9, suitably insulated at 10 and supported by a metallic frame structure 11 attached to the frame structure of the channel support, is shown in Figs. 1 and 2 as constituting a glass receiving extension of the channel at the delivery end of the forehearth. The glass feed spout 9 has a discharge outlet 12 in its base for the feeding of glass for mold charges, the discharge of glass through the outlet 12 being under the control of the refractory tube 13 and the reciprocable plunger 14.

The glass passing from the furnace outlet into the flow channel of the forehearth preferably is required to pass beneath a refractory gate 15 which preferably is vertically adjustable and serves not only as a skimmer block but acts in conjunction with the fixed transverse block 16 and the adjacent wall of the furnace structure to separate the space above the glass within the furnace from the space above the glass in the forehearth. The melting furnace may be of the "bridgeless" type and the glass flowing therefrom through the outlet 4 may be relatively hot. In that event, the refractory member 15 may dip a substantial distance below the surface of the molten glass in a portion of the channel that is relatively deep, as indicated at 17. However, the major portion of the channel of the forehearth preferably is relatively shallow, the bottom wall thereof being offset upwardly in advance of the skimmer block 15, as indicated at 18, and in order to provide for readily obtainable dependable control of the temperature and viscosity of the glass passing along the flow channel of the forehearth to the delivery bowl 9.

The upper portion of the forehearth structure, shown in Figs. 1 to 4 inclusive, is formed to provide a front conditioning chamber 19 and a main or rear conditioning chamber 20, separated from each other by a transverse refractory partition or barrier 21. In the particular construction shown, a transverse refractory member 22 at the front of the skimmer block 15 forms the rear wall of the main conditioning chamber 20, but it is to be understood that this transverse member 22 may be omitted and the main conditioning chamber 20 may extend from the transverse partition 21 to the skimmer block 15, the latter then being made of sufficient height to form the rear wall for such chamber.

The main conditioning chamber 20 comprises the longitudinally extending side firing spaces 23 into which flame or combustible mixture may be projected through suitable lateral openings 24 in burner blocks which are included in the side walls of the main conditioning chamber 20. Preferably spaced blocks of the side walls of the main conditioning chamber extend within such chamber substantially as indicated at 25, 26, 27, 28 and 29 in Fig. 2 for the double purpose of dividing each of the side firing spaces into practically separate divisions along the length of the conditioning chamber 20 and to afford more stable support for the top or cover of the conditioning chamber 20.

Figure 3:
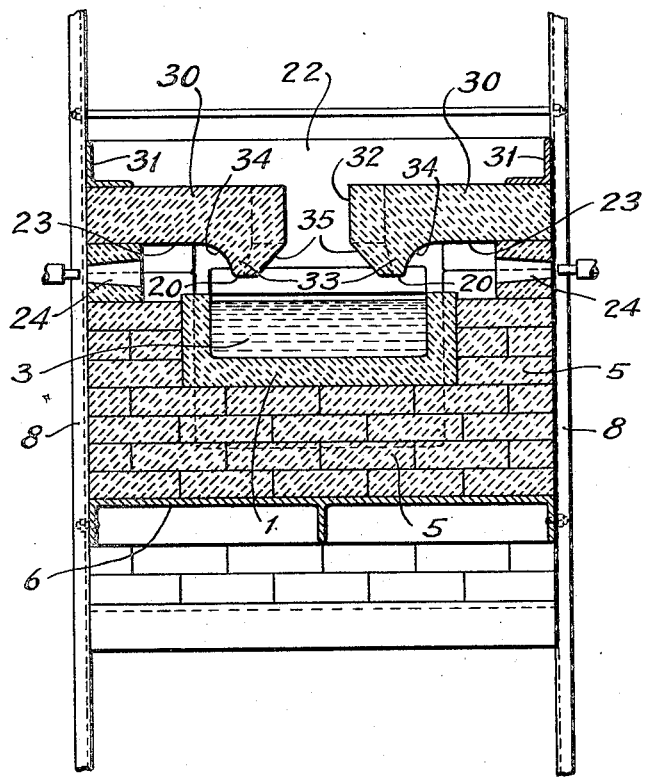
Fig. 3 is a transverse vertical section substantially along the line 3—3 of Fig. 1.

The cover of the main conditioning chamber 20 comprises a pair of longitudinally extending spaced cover blocks 30 which are supported from their outer edges for part of their width on the blocks of the side walls of the main conditioning chamber 20, onto which they are clamped by any suitable fastening means, such as the angle irons 31, which may be secured to the standards of the supporting frame structure of the forehearth. The inner side edge portions of the cover blocks 30 extend beyond the side walls of the flow channel 1 and above the side portions of the glass therein as best seen in Figs. 2 and 3, being spaced at their inner side edges to provide the longitudinally extending cooling opening 32. Preferably, such cooling opening decreases gradually in width from the rear end of the main conditioning chamber 20 to the front end of the latter so that the volume of heat radiating through such opening will decrease regularly from the rear to the front end of the main conditioning chamber.

The inner side edge portions of the cover blocks 30 are enlarged downwardly, as indicated at 33, Fig. 3, to produce double-faced longitudinally extending baffle walls and to aid in providing a longitudinally extending cooling space between the side firing spaces 23. The outer side faces of the downwardly projecting baffles 33 are curved, as indicated at 34, to deflect heat and flame from the burners and radiant heat downwardly toward the glass of the side or border portions of the stream of the flow channel 1. The inner faces 35 of the baffles 33 are beveled downwardly and outwardly so as to deflect heat from the middle portion of the stream upwardly and inwardly into and through the opening 32 and to permit the heated gases which have passed from the side firing spaces into contact with the side portions of the stream to pass upwardly into and through the opening 32 without any objectionable radiation of heat downwardly and laterally onto the glass. Preferably, the degree of bevel of the faces 35 is varied with the width of the opening 32 so that heat will not be radiated through the opening directly from the extreme side edges of the stream of glass in the channel 1 at any place along the length of the main conditioning chamber.

The front wall 21 of the main conditioning chamber preferably extends nearly to the glass level so that conditions within the front conditioning chamber 19 may be controlled and maintained independently of conditions within the main conditioning chamber.

The rear portion of the space within the front conditioning chamber 19 has a relatively great height and may have an arched cover structure, as indicated at 36. The intermediate portion of the conditioning chamber 19 may have a downwardly and forwardly inclined cover structure, as indicated at 37, while the remaining or forward portion of the conditioning chamber 19 may comprise the space above the glass in the feed bowl 9 and the cover structure thereof, indicated at 38, may be at any desired height above the glass. As shown, it is lower than the crown of the arched cover 36. The arched cover structure 36 is provided above the longitudinal median portion of the glass in the channel with an opening 39, for purposes which will be hereinafter stated. The front portion of this opening 39 preferably is reduced considerably in width, as indicated at 40.

The side walls of the cover structure 36 are provided above the glass level with burner openings 41. The side walls of the conditioning chamber 19 also are provided with front burner openings 42 which extend obliquely to the direction of flow of the glass in the flow channel and preferably open into the conditioning chamber 19 in position to project convergent flames from burners and heated gases across the space above the glass in the delivery bowl at opposite sides of the vertical glass feed regulating tube toward a point of convergence close to the front wall of the space above the glass in the feed spout, whereby an effective distribution of heated gases within the space above the glass in the feed spout will be obtained. An arcuate slot 43 may be provided in the portion 38 of the cover structure of the chamber 19, approximately above the place of convergence of the blasts from the burners in the openings 42 for the ingress of air or the egress of heated gases at the front of the chamber 19 to aid in controlling the effective action and movements of the heated gases above the glass at the delivery end of the forehearth.

The operation of the construction that has been described may be substantially as follows:

The glass passing from the outlet of the furnace beneath the skimmer block may be from a "bridgeless" furnace and may be hotter than is desired for the use for which such glass is intended. Assuming that this condition exists, the middle portion of the stream, which would tend to remain relatively hot, is cooled by radiation of heat therefrom through the opening 32, which may be left entirely uncovered or unobstructed. At the same time, heat may be applied to the marginal or side portions of the stream from the burners in the openings 24, either in all the divisions of the side firing chambers or from the burners in selected divisions of the side firing spaces, to heat the glass in the side portions of the stream, as required, to bring the temperature and viscosity thereof in substantial coincidence with the temperature and viscosity of the middle portion of the stream during the passage of the glass through the main conditioning chamber. The glass entering the front conditioning chamber 19 will have a uniform velocity throughout its cross section and will have substantially the temperature and condition desired. In order to maintain such desirable condition of the glass during its passage through the front conditioning chamber 19 and while it is in the feed spout 9 or to aid in establishing such desirable condition not previously attained, heat may be admitted to the front conditioning chamber through the burners in the openings 41 and/or 42 as required either to maintain desirable temperature and viscosity in the glass or to increase the temperature and lower the viscosity of the glass. The opening 39 may be partially or completely closed or left entirely unobstructed according to particular requirements. Such opening may be used mainly as a vent for the heated gases within the front conditioning chamber, the draft thereto thus aiding in producing desirable travel and distribution of heat from the burners of the front conditioning chamber. The opening 39 may be completely or partially covered with a heat retaining cover, not shown, to practically prevent or reduce heat loss therethrough and to aid in regulating draft conditions in the forehearth. It also will be understood that the opening 39 may be used as a cooling opening if it is desired to cool the glass passing therebeneath.

The opening 43 at the extreme outer end of the cover structure of the forehearth likewise may be covered completely or more or less by a refractory block if draft therethrough is to be prevented or lowered.

Should the temperature of the glass be lower than as above indicated at the time the glass enters the inner end of the main conditioning chamber, the cooling opening 32 may be partially or completely covered by a refractory block or blocks and heat from the burners in the side firing spaces then may be utilized to effect any heating of the glass of the middle portion of the stream that may be required in addition to the relatively greater heating of the glass of the side portions of the stream, or to reduce the rate of cooling of the middle portion of the glass stream. It is apparent that the hereinbefore described means for regulably controlling the temperature and condition of the glass of the stream in the main conditioning chamber and in the front conditioning chamber may be employed in various manners to obtain various heating and/or cooling effects within wide ranges according to particular service requirements at any given time.

Tile or other heat insulating members, not shown, may be employed to cover or partially cover the opening 32 to regulate either the effective width or length or both width and length of such opening, thereby providing a regulable control of the area of the cooling opening for the radiation of heat above longitudinal median portion of the glass in the forehearth.

The construction shown in Fig. 5 differs from that of Figs. 1 to 4 inclusive in that a refractory basin 44 instead of the feed bowl 9 is provided at the outer end of the flow channel 1. The basin 44 is adapted to hold glass from the channel 1 as a pool from which glass may be gathered by suction in molds or other gathering receptacles. Suitable circulating or stirring means, not shown, may be provided for stirring the glass in the gathering pool to effect reheating and reassimilation by the heated glass of any glass that has been chilled during the gathering operation. The front conditioning chamber of the construction shown in Fig. 5 is indicated at 19a and differs from that shown in Fig. 1 and hereinbefore described in that the front or outer end wall of such chamber comprises a vertically adjustable refractory baffle or barrier 45 which extends across the space above the glass inwardly of the front wall of the basin 44 so that part of the glass in the basin will be exposed and accessible to the glass gathering receptacles. The lower end of the refractory baffle 45 extends nearly to the glass level and is adjustable to vary the interchange of heat between the front conditioning chamber 19 and the space above the exposed portion of the gathering pool. The front burner openings, such as indicated at 42 in the construction of Fig. 1, may be omitted from the construction of Fig. 5. The remaining parts of the construction shown in Fig. 5 may be identical in essential respects with corresponding parts of the construction shown in Fig. 1 and therefore have been designated by the same reference characters in both Figs. 1 and 5 and will not be further described.

The glass gathering basin and associate baffle structure for controlling the exchange of heat between the front conditioning chamber 19a and the space above the exposed portion of the glass in the gathering pool corresponds substantially with the construction disclosed and claimed in the co-pending application of Karl E. Peiler, Serial No. 387,285, filed August 21, 1929, and is not being claimed herein as per se it is not part of the present invention.

We claim:

1. A forehearth having a channel for conducting molten glass from a melting furnace or other source of supply to a place at which glass is to be removed, means providing a cover structure for the channel, said cover structure having a longitudinally extending opening above the middle portion of the glass in said channel, said longitudinal opening being of different widths at the opposite ends thereof.

2. A forehearth having a channel for conducting molten glass from a melting furnace or other source of supply to a place at which glass is to be removed, means providing a cover structure for the channel, said cover structure having a longitudinally extending opening above the middle portion of the glass in said channel, said longitudinal opening varying in width throughout its length.

3. A forehearth having a channel for conducting molten glass from a melting furnace or other source of supply to a place at which glass is to be removed, means providing a cover structure for the channel, said cover structure having a longitudinally extending opening above the middle portion of the glass in said channel, said longitudinal opening decreasing in width toward the outer end of the forehearth.

4. A forehearth having a flow channel for molten glass, means for insulating the sides and bottom of said flow channel against heating loss, means providing a pair of side firing spaces for supplying heat directly to the portions of glass at the sides of said channel and for providing a longitudinally extending cooling chamber above the glass in the longitudinal median portion of the channel, said cooling chamber decreasing in width from its inner end toward its outer end.

5. A forehearth having a flow channel for molten glass, means for insulating the side and bottom of said flow channel against heating loss, means providing a pair of side firing spaces for supplying heat directly to the portions of glass at the sides of said channel and for providing a longitudinally extending cooling chamber above the glass in the longitudinal median portion of the channel, said cooling chamber decreasing in width from its bottom for part of its height.

6. A forehearth for molten glass comprising a refractory flow channel for receiving glass from a melting furnace or other source of supply, a cover structure for said channel formed to provide a longitudinally extending opening above the glass at the middle of said channel, the portions of said cover at the edges of such opening being extended downwardly to provide longitudinally extending baffles, said baffles having downwardly and outwardly inclined inner faces for deflecting heat from the longitudinal median portion of the stream upwardly into said opening and outer faces for deflecting heated gases from the sides of the channel downwardly toward the glass in the side portions of said channel, said longitudinal opening decreasing in width from one end thereof toward its opposite end, the inclination of said inner faces of said baffles varying with the width of said opening.

7. The combination with a glass melting furnace of a forehearth having a channel along which glass may flow from the furnace to a place at which portions of such glass are to be removed, heat insulation for the sides and bottom of said channel, a cover structure enclosing the space above such channel, a refractory member extending transversely of said cover structure and dipping into the glass adjacent to said furnace to separate the space within said cover structure from the space above the glass in the furnace, said cover structure being formed to provide side firing spaces extending along the edges of said channel from a place adjacent to said separator member for part of the length of the channel and to provide a longitudinally extending opening in the top portion of said cover structure above the glass in the middle portion of the channel, said opening extending for the major part of the length of the channel, a transversely extending partition depending within said cover structure nearly to the glass level at the outer ends of said firing spaces and said opening, said cover structure being formed in advance of said transverse partition to permit the independent control of temperature and draft conditions in the outer end portion of said forehearth.

8. A forehearth having a flow channel for conducting molten glass from a melting furnace to a receptacle for the glass at the outer end of the channel, means providing a conditioning chamber for the glass in the receptacle and outer end portion of the channel, said conditioning chamber being separated from the influence of temperature and draft conditions in the space above the glass in the remainder of the flow channel and having a relatively high inner end portion provided with lateral openings for the admission of heating media and a top opening for the venting of heated gases and a lower outer end portion having an opening in its top close to the outer end thereof and a pair of side openings for directing convergent streams of heating media above the glass to a point adjacent to the outer end of the conditioning chamber and approximately beneath said last named top opening.

9. A forehearth having a channel along which molten glass may flow in a stream from a melting furnace or like source of supply to a place at which glass is to be removed, and means for producing a graduated cooling of the glass of the middle portion of the stream during the flow of such glass along said channel for a substantial part of the length thereof.

10. A forehearth having a channel along which molten glass may flow in a stream from a melting furnace or like source of supply to a place at which glass is to be removed, and means for producing a gradually decreasing cooling of the glass of the middle portion of the stream during the flow of such glass along said channel for a substantial part of the length thereof.

11. A forehearth having a channel for conducting molten glass from a melting furnace or other source of supply to a place at which glass is to be removed, means for locally heating the side portions of the glass in the channel, and means for causing a graduated cooling of glass in the middle portion of the channel throughout a substantial part of the length of such channel.

12. A forehearth having a channel for conducting molten glass from a melting furnace or other source of supply to a place at which glass is to be removed, means for causing independently controllable local heating of side portions of the glass in the channel at a plurality of different places along the length of the channel, and means for causing a graduated cooling of the middle portion of the glass in the channel throughout a substantial part of the length of said channel.

Signed at Hartford, Connecticut, this 22nd day of October, 1929.

VERGIL MULHOLLAND.
ALFRED R. HUNTER.